United States Patent
Bjarnason

(10) Patent No.: US 10,469,528 B2
(45) Date of Patent: Nov. 5, 2019

(54) ALGORITHMICALLY DETECTING MALICIOUS PACKETS IN DDOS ATTACKS

(71) Applicant: Arbor Networks, Inc., Burlington, MA (US)

(72) Inventor: Steinthor Bjarnason, Fjerdingby (NO)

(73) Assignee: Arbor Networks, Inc., Westford, MA (US)

( * ) Notice: Subject to any disclaimer, the term of this patent is extended or adjusted under 35 U.S.C. 154(b) by 208 days.

(21) Appl. No.: 15/443,525

(22) Filed: Feb. 27, 2017

(65) Prior Publication Data

US 2018/0248908 A1 Aug. 30, 2018

(51) Int. Cl.
*H04L 29/06* (2006.01)

(52) U.S. Cl.
CPC ...... *H04L 63/1458* (2013.01); *H04L 63/1416* (2013.01); *H04L 63/1425* (2013.01); *H04L 2463/141* (2013.01)

(58) Field of Classification Search
None
See application file for complete search history.

(56) References Cited

U.S. PATENT DOCUMENTS

| | | | | |
|---|---|---|---|---|
| 2006/0230167 A1* | 10/2006 | Watanabe | ............... | H04L 43/00 709/230 |
| 2007/0115850 A1* | 5/2007 | Tsuchiya | ............... | H04L 43/022 370/252 |
| 2007/0180526 A1* | 8/2007 | Copeland, III | ..... | H04L 63/1416 726/23 |
| 2007/0204060 A1* | 8/2007 | Higuchi | ................. | H04L 43/16 709/234 |
| 2011/0242994 A1* | 10/2011 | Carvalho | .............. | H04L 43/022 370/252 |

* cited by examiner

*Primary Examiner* — Fatoumata Traore
(74) *Attorney, Agent, or Firm* — Locke Lord LLP; Scott D. Wofsy; Christopher J. Capelli

(57) ABSTRACT

A method for detecting patterns using statistical analysis is provided. The method includes receiving a subset of structured data having a plurality of fields. A plurality of value combinations is generated for the plurality of fields using a statistical combination function. Each combination of the generated plurality of value combinations is stored as a separate entry in a results table. The entry in the results table includes a counter associated with the stored combination. A value of the counter is incremented for every occurrence of the stored combination in the generated plurality of value combinations. The results table is sorted based on the counters' values and based on a number of fields in each combination. One or more entries having highest counter values are identified in the results table.

15 Claims, 4 Drawing Sheets

ALGORITHMICALLY DETECTING MALICIOUS PACKETS IN DDOS ATTACKS

FIELD OF THE INVENTION

Embodiments of the present invention relate generally to methods and systems for malware detection and mitigation, and specifically to algorithmically detecting malicious packets in Distributed Denial of Service ("DDoS") attacks.

BACKGROUND OF THE INVENTION

Attacks, such as attacks utilizing flooding, denial of service, DDoS, viruses, worms, trojan horses, rouge applications, malware, exploits, spam, phishing, etc., are becoming an ever-increasing problem in today's Internet. For example, by sending large amounts of malicious packets, denial of service attacks can cause consumption and/or overload of scarce, limited, and/or non-renewable system and/or network resources, such as bandwidth, disk space, CPU time, and/or allocations thereof; destruction and/or alteration of configuration information, such as routing information; disruption of normal operating system functionality; and/or physical destruction and/or alteration of network components, etc.

DDoS attacks may be aimed at different types of services available on a network including, for example, DNS, HTTP (e.g., web traffic), encryption, time services, streaming services, VoIP. DDoS attacks may be aimed at vulnerable corporate services such as, for example, DNS that translates Internet names to addresses. DDoS attacks come in mainly two varieties. One attempts to shut down the DNS system specifically in relation to the target site so that no legitimate user can obtain a valid translation and make a request from that site, such as by altering the operation of the DNS server to provide an invalid translation. Another type of DDoS attack attempts to overload a DNS server directly with a flood of malicious packets that exceeds the capacity of the server, thereby preventing access to all sites whose address translations are dependent thereon.

Once an attack is successfully detected, standard mitigation tactics are typically inadequate in resolving a DDoS attack. Typical mitigation policies involve discarding all packets destined to a victim server without analyzing whether the packets originated from a legitimate user or an attacker. Also, standard approaches do not offer the ability to export real-time data to other apparatuses, nor do they allow an operator to configure a flexible, customized policy. It should be noted that, in many cases, the malicious packets sent by the attackers have similar structure and layout which, if detected, may be used to drop the malicious packets.

As such, a new, scalable, and robust DDoS Detection and Mitigation approach with inherent intelligence, which addresses all the shortcomings discussed above, is desirable. Such an approach should be capable of maintaining accurate state information to check for anomalous traffic patterns (to detect a variety of high rate DDoS attacks), should be capable of distinguishing between an attacker and a legitimate user when an attack is detected, should allow an operator to configure a flexible mitigation policy, and should be capable of operating without degrading the overall system performance (forwarding data path or control plane CPU).

SUMMARY OF THE INVENTION

The purpose and advantages of the illustrated embodiments will be set forth in and apparent from the description that follows. Additional advantages of the illustrated embodiments will be realized and attained by the devices, systems and methods particularly pointed out in the written description and claims hereof, as well as from the appended drawings.

In accordance with a purpose of the illustrated embodiments, in one aspect, a method for detecting patterns using statistical analysis is provided. The method includes receiving a subset of structured data having a plurality of fields. A plurality of value combinations is generated for the plurality of fields using a statistical combination function. Each combination of the generated plurality of value combinations is stored as a separate entry in a results table. The entry in the results table includes a counter associated with the stored combination. A value of the counter is incremented for every occurrence of the stored combination in the generated plurality of value combinations. The results table is sorted based on the counters' values and based on a number of fields in each combination. One or more entries having highest counter values are identified in the results table.

In another aspect, a monitoring system includes a monitored network consisting of a plurality of devices. The monitoring system also includes a storage repository for storing network traffic flow information and one or more network monitoring devices communicatively coupled to the monitored network and to the storage repository. The monitoring device(s) are configured and operable to receive from the storage repository a subset of structured data having a plurality of fields and generate a plurality of value combinations for the plurality of fields using a statistical combination function. The monitoring device(s) are further configured and operable to store each combination of the generated plurality of value combinations as a separate entry in a results table. The entry in the results table includes a counter associated with the stored combination. A value of the counter is incremented for every occurrence of the stored combination in the generated plurality of value combinations. The monitoring device(s) are further configured and operable to sort the results table based on the counters' values and based on a number of fields in each combination and to identify one or more entries in the results table having highest counter values.

BRIEF DESCRIPTION OF THE DRAWINGS

The accompanying appendices and/or drawings illustrate various, non-limiting, examples, inventive aspects in accordance with the present disclosure.

DETAILED DESCRIPTION OF CERTAIN EMBODIMENTS

Figure 1:
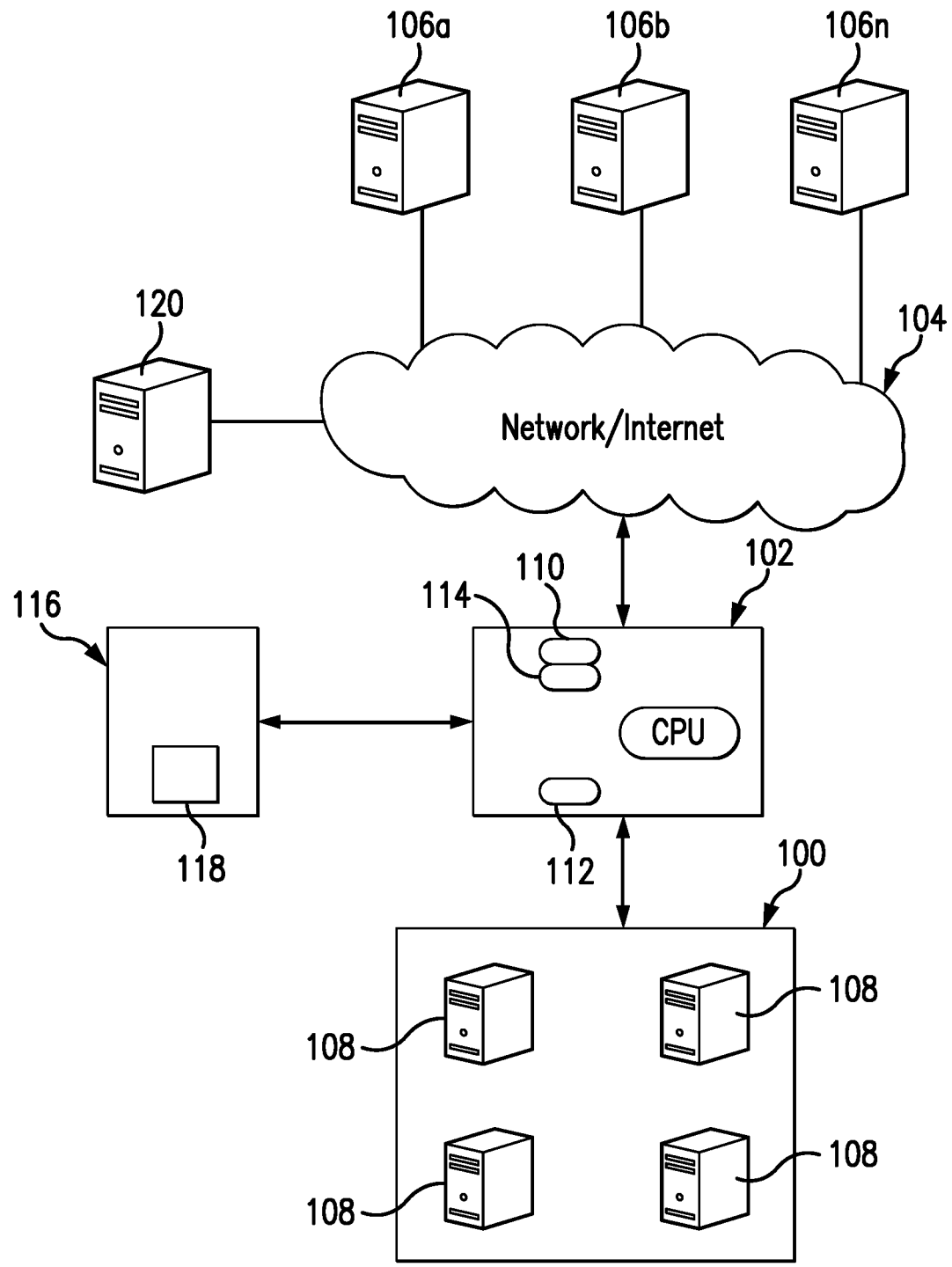
FIG. 1 is a schematic diagram showing network architecture and the relationship between an attack mitigation device and protected network according to one embodiment of the present invention.

The present invention is now described more fully with reference to the accompanying drawings, in which illustrated embodiments of the present invention are shown wherein like reference numerals identify like elements. The present invention is not limited in any way to the illustrated embodiments as the illustrated embodiments described below are merely exemplary of the invention, which can be embodied in various forms, as appreciated by one skilled in the art. Therefore, it is to be understood that any structural and functional details disclosed herein are not to be interpreted as limiting, but merely as a basis for the claims and as a representative for teaching one skilled in the art to variously employ the present invention. Furthermore, the terms and phrases used herein are not intended to be limiting but rather to provide an understandable description of the invention.

Unless defined otherwise, all technical and scientific terms used herein have the same meaning as commonly understood by one of ordinary skill in the art to which this invention belongs. Although any methods and materials similar or equivalent to those described herein can also be used in the practice or testing of the present invention, exemplary methods and materials are now described. It must be noted that as used herein and in the appended claims, the singular forms "a", "an," and "the" include plural referents unless the context clearly dictates otherwise. Thus, for example, reference to "a stimulus" includes a plurality of such stimuli and reference to "the signal" includes reference to one or more signals and equivalents thereof known to those skilled in the art, and so forth.

It is to be appreciated the embodiments of this invention as discussed below are preferably a software algorithm, program or code residing on computer useable medium having control logic for enabling execution on a machine having a computer processor. The machine typically includes memory storage configured to provide output from execution of the computer algorithm or program.

As used herein, the term "software" is meant to be synonymous with any code or program that can be in a processor of a host computer, regardless of whether the implementation is in hardware, firmware or as a software computer product available on a disc, a memory storage device, or for download from a remote machine. The embodiments described herein include such software to implement the equations, relationships and algorithms described below. One skilled in the art will appreciate further features and advantages of the invention based on the below-described embodiments. Accordingly, the invention is not to be limited by what has been particularly shown and described, except as indicated by the appended claims.

In exemplary embodiments, a computer system component may constitute a "module" that is configured and operates to perform certain operations as described herein below. Accordingly, the term "module" should be understood to encompass a tangible entity, be that an entity that is physically constructed, permanently configured (e.g., hardwired) or temporarily configured (e.g. programmed) to operate in a certain manner and to perform certain operations described herein.

It is to be further understood the illustrated embodiments of the present invention describe a system, apparatus and method for avoiding and mitigating the harmful effects of a DDoS attack on a computer system/device or network.

Turning now descriptively to the drawings, in which similar reference characters denote similar elements throughout the several views, FIG. 1 illustrates the relationship between the protected network 100, attack mitigation device 102, Internet 104, and external host devices 106a, 106 b . . . 106 n.

In a typical implementation, the external host devices 106 a, 106 b . . . 106n (also referred to as external devices or host devices) attempt to connect to protected devices 108 within the protected network 100 typically via a private network or a public computer network such as the Internet 104. Examples of external host devices include servers, laptops, desktop computers, tablet devices, mobile phones, mobile computing devices, video games systems, televisions and other similar devices and systems having Internet connectivity.

In a preferred embodiment, the protected network 100 is protected by the attack mitigation device 102 preferably located between the Internet 104 and the protected network 100. Usually, the protected network 100 is an enterprise network, such as a school network, business network, and government network, to list a few examples. In other embodiments, the attack mitigation device 102 is located within the Internet, service provider network or enterprise network rather than as a network edge as illustrated. It is to be appreciated that when deployed within the protected network, traffic is diverted to the mitigation device 102.

The mitigation device 102 preferably includes a packet processing system preferably having an external high-speed network interface 110 and a protected high-speed network interface 112. Under current technology, these interfaces are capable of handling 1.0-100 Gbps, for example. The mitigation device 102 may further include processors 114 that preferably process the packets received at interfaces 110 and 112. Additionally, a central processing unit (CPU), random access memory (RAM), and a storage medium 116 are preferably used to further support the processing of the received packets and are described in detail below in conjunction with FIG. 3. The storage medium 116 also preferably stores results tables 118 used in the below described pattern detection process as well as other possible information such as predefined filter rules.

In a typical implementation, the mitigation device 102 authenticates all external host devices 106 a, 106 b . . . 106 n before allowing the external devices to access the protected devices 108 within the protected network 100.

To protect against DoS attacks, the mitigation device 102 distinguishes between requests from legitimate hosts 106a-106n and attack traffic from attacking host 120 by performing an analysis procedure that combines content analysis with statistical analysis. Advantageously, the mitigation device 102 can perform the analysis either on live or stored data. In either case, the results of such analysis can enable the mitigation device 102 to provide sophisticated attack protection services such as blocking packets matching the detected patterns in attack traffic, either in a manual or automated fashion. The mitigation device 102 can also perform pattern detection analysis on the packet payload, to immediately detect, for example, a particular application specific malicious attack pattern.

As noted above, typically, the mitigation device 102 may employ a combination of different analysis procedures/algorithms (e.g., content analysis and statistical analysis). The mitigation device 102 stores the results of the combined analysis in a results table 118. In one embodiment, the results table 118 is a data structure that stores unique combinations of all field values contained in a subset of structured data (such as combinations of all fields contained in the packet headers). As used herein, the term "structured data" refers to data that is defined or organized according to a fixed structure. The results table 118 also includes one or more counters that keep track of the number of times a particular unique combination of fields is detected. The host table is 118 is typically allocated a fixed amount of memory for storing this information. However, it should be noted, that at least some of the protected devices 108 (e.g., DNS servers) may handle millions of requests every hour from many different external devices 106a-106n. In a conventional DDoS attack mitigation device, the large volume and large number of unique host addresses may make analyzing incoming traffic packets on an individual basis problematic, because it may consume too much system resources. Thus, the conventional DDoS protection solutions are ill-suited to mitigate large-scale attacks.

Advantageously, the embodiments disclosed herein offer a novel approach that can detect and mitigate a large-scale attack campaign where a vast number of attack tools participate in attacking the protected network 100. As discussed further below, the attack mitigation device 102 is configured to utilize one or more statistical techniques to detect attack patterns much faster and in much greater detail than existing malicious attack mitigation solutions, thusly making the disclosed technique more efficient in responding to distinct changes in attack patterns. In various embodiments, the combination of content and statistical analysis enables the mitigation device 102 to fully automate the "detect-mitigate-analyze results" cycle, thereby reducing the time needed to detect and mitigate sophisticated attacks in fully automated mode and improve the overall user experience.

According to exemplary configuration illustrated in FIG. 1, the attack mitigation device 102 may comprise a Client Edge (CE) device. The CE device can provide entry points into the protected network 100. In alternative configuration, the attack mitigation device 102 may comprise a virtual device. In other words, at least some of the embodiments do not require the attack mitigation device 102 to be a physical hardware device or to be located in a particular part of the network infrastructure, as long as the attack mitigation device 102 can be in the path of the incoming traffic to the protected network 100.

Figure 2:
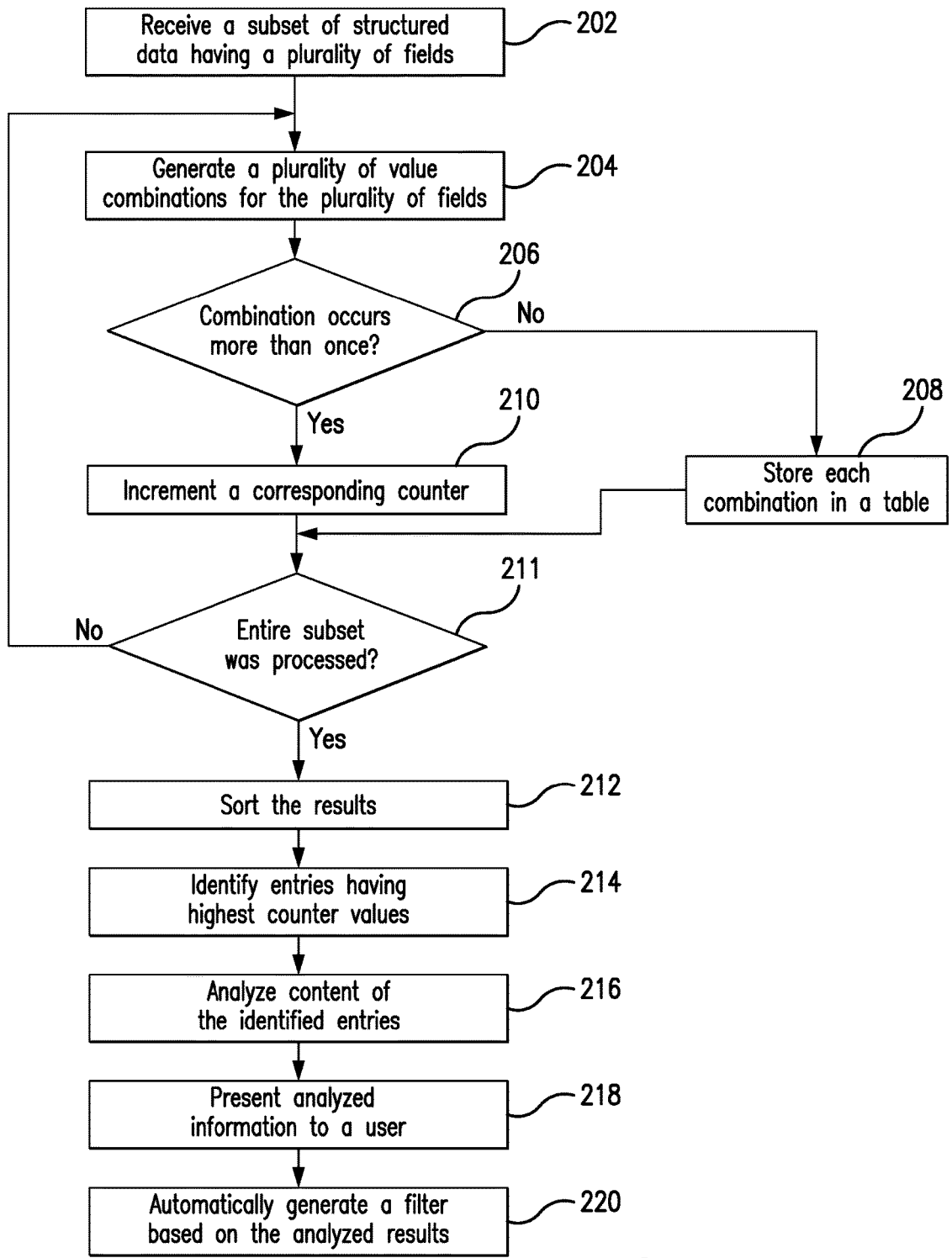
FIG. 2 is a flowchart illustrating a method for detecting patterns using statistical analysis in accordance with the illustrated embodiments.

FIG. 2 shows an exemplary and non-limiting flowchart illustrating a method for mitigating network attacks in accordance with certain illustrated embodiments. Before turning to description of FIG. 2, it is noted that the flow diagram in FIG. 2 shows example in which operational steps are carried out in a particular order, as indicated by the lines connecting the blocks, but the various steps shown in this diagram can be performed in any order, or in any combination or sub-combination. It should be appreciated that in some embodiments some of the steps described below may be combined into a single step. In some embodiments, one or more additional steps may be included.

While the embodiments describe the network attack mitigation device with specific reference to steps directed to detect security and performance issues and/or mitigate detected breaches of a security policy, alternative data analyzing devices may be used provided they are adapted to apply content-specific logic to processing structured data in order to detect underlying patterns.

Existing security solutions for different types of networks typically identify attacks by either analyzing individual packets for malicious content (such systems as, but not limited to, Intrusion Detection Systems (IDS) and Intrusion Protection Systems (IPS)) or by counting how many times a specific value is seen in packet flow (e.g., Netflow analysis systems). Even under ideal circumstances, significant computing resources are required to perform such analysis on pre-stored network data. In contrast, various embodiments of the present invention contemplate an alternative approach that combines content analysis with statistical analysis to efficiently detect underlying attack patterns either on live data to be directed out of the live network environment or network traffic data stored in a file or other storage (e.g., register and/or memory) location. In one embodiment described below, to protect against DDoS attacks, the mitigation device 102 utilizes this approach to take a snapshot of the attack traffic (either volume or time based) and then calculate how often both the content of each packet header field and each field combination appear in the attack traffic.

More specifically, at step 202, the mitigation device 102 receives a subset of structured data having a plurality of fields. For example, this subset may include a subset (snapshot) of the traffic flow records. In one embodiment, the mitigation device 102 may obtain data that is representative of particular network traffic transmitted over a network during a particular time interval which may be loaded, for example, from a Packet Capture (PCAP) file or some other type of log file. In another embodiment, packets flowing through the network may be intercepted and analyzed by the mitigation device 102 to detect whether or not one or more components of the protected network 100 are being attacked and/or protect the one or more protected components 108 from being overloaded. In some embodiments functionality of the mitigation device 102 may include selective interception of packets, selective modification of those intercepted packets and the subsequent release/reinsertion of the packets, modified or unmodified, and/or release of new packets, back into the general stream of network traffic. Table 1 shown below illustrates an exemplary snapshot that includes packet header information associated with ten different packets. While only ten packets are shown in Table 1, a subset can comprise any number of packets. For example, a subset can comprise from approximately 1000 packets to approximately 5000 packets. As computational systems become more powerful, it is conceivable that the mitigation device 102 can process a substantially higher number of packets without degrading the overall performance of the system.

TABLE 1

| Source IP | Source Port | Destination IP | Destination Port | Packet Length |
|---|---|---|---|---|
| 1.2.3.4 | 1234 | 10.2.55.87 | 80 | 120 |
| 4.5.6.7 | 54321 | 10.2.55.87 | 80 | 55 |
| 8.9.10.11 | 5324 | 10.2.55.87 | 80 | 230 |
| 12.13.14.15 | 33434 | 10.2.55.87 | 80 | 45 |
| 16.17.18.19 | 3433 | 10.2.55.87 | 80 | 55 |
| 1.2.3.4 | 5324 | 10.2.55.87 | 80 | 15 |
| 20.21.22.23 | 8879 | 10.2.55.87 | 80 | 55 |
| 1.2.3.4 | 1234 | 10.2.55.87 | 80 | 400 |
| 24.25.26.27 | 4234 | 10.2.55.87 | 80 | 55 |
| 28.29.30.31 | 8774 | 10.2.55.87 | 80 | 55 |

Next, at step 204, the mitigation device 102 generates all possible value combinations of the plurality of fields. In other words, according to an embodiment of the present invention, at step 204, the mitigation device 102 calculates all combinations of all fields extracted from the header portion of each received packet using a statistical function C (n, r). All possible combinations are generated beginning with individual packet header fields and continuing up to the max number of packet header fields (where n=5 and r=1, 2, 3, 4 and 5). More specifically, continuing with the example above, for the first packet in Table 1, the mitigation device 102 calculates all possible combinations: C(5,1)+C(5,2)+C(5,3)+C(5,4)+C(5,5). In this case the statistical function (5,1) would produce 5 singleton combinations—{1.2.3.4}, {1234}, {10.2.55.87}, {80}, {120}; statistical function {5,2} would produce 10 pair combinations {1.2.3.4, 1234}, {1.2.3.4, 10.2.55.87}, {1.2.3.4, 80}, {1.2.3.4, 120}, {1234, 10.2.55.87}, {1234, 80}, {1234, 120}, {10.2.55.87, 80}, {10.2.55.87, 120} and {80,120}; statistical function (5,3) would produce 10 triple field combinations—{1.2.3.4, 1234, 10.2.55.87}, {1.2.3.4, 1234, 80}, {1.2.3.4, 1234, 120}, {1.2.3.4, 10.2.55.87, 80}, {1.2.3.4, 10.2.55.87, 120}, {1.2.3.4, 80, 120}, {1234, 10.2.55.87, 80}, {1234, 10.2.55.87, 120}, {1234, 80, 120}, {10.2.55.87, 80,120}; statistical function (5,4) would produce 5 quadruple field combinations—{1.2.3.4, 1234, 10.2.55.87, 80}, {1.2.3.4, 1234, 10.2.55.87, 120}, {1.2.3.4, 1234, 80, 120}, {1.2.3.4, 10.2.55.87, 80, 120}, {1234, 10.2.55.87, 80, 120} and statistical function (5,5) would produce one combination containing all header fields—{1.2.3.4, 1234, 10.2.55.87, 80,120}. Thus, just for the first packet alone the mitigation device 102 generate 31 combinations (5+10+10+5+1) of all possible field values, where only five fields are being analyzed.

Next, the mitigation device 102 stores each generated combination in a dedicated results table as a separate entry. It should be noted that each entry in the results table may have one or more counters associated therewith. According to an embodiment of the present invention, as part of the results storing operation, at step 206 the mitigation device 102 determines if any of the newly generated combinations already exists in the results table. In response to determining that a newly generated combination does not already exist (decision block 206, "No" branch), the mitigation device 102 stores such combination in the results table (step 208). However, if the newly generated combination already exists in the results table (decision block 206, "Yes" branch), at step 210, the mitigation device 102 increments the counter associated with that particular entry. Continuing with the example above, once the mitigation device 102 generates all 31 combinations corresponding to first packet of the exemplary snapshot, it uses the same statistical approach to generate all possible field value combinations for the second data packet. For example, calculating C (5, 2) function for the second data packet would yield the following combinations: {4.5.6.7, 54321}, {4.5.6.7, 10.2.55.87}, {4.5.6.7, 80}, {4.5.6.7, 55}, {54321, 10.2.55.87}, {54321, 80}, {54321, 55}, {10.2.55.87, 80}, {10.2.55.87, 55}, {80, 55}. However, the combination {10.2.55.87, 80} has been already generated for the first packet. In this case, instead of storing this particular combination in the results table for a second time, the mitigation device 102 increments the counter associated with the results table entry for {10.2.55.87, 80} (step 210). In other words, calculation of the C (5, 2) function for the second packet generates 10 combinations, 9 of which are new and unique and are stored in the results table as separate entries (step 208), but since the entry for the combination {10.2.55.87, 80} already exists in the result table, the mitigation device 102 increments the counter associated with that particular entry.

At step 211, the mitigation device 102 determines if all incoming subset of data has been processed. For example, step 211 may include determining if additional data packets have not been processed. If all incoming data received in step 202 has not been processed (decision block 211, "No" branch), the mitigation device 102 may repeat processing steps 204-210 for the next portion of packets until all data packets received in step 202 have been processed. Processing of all received packets results in a table such that the table contains all possible unique packet header field combinations for all received packets as separate entries. Furthermore, each entry in the table is associated with a counter. A value of the counter is incremented by the mitigation device 102 for every occurrence of the stored combination in the generated plurality of value combinations.

According to an embodiment of the present invention, at step 212, in response to determining that the entire subset was processed (decision block 211, "Yes" branch), the mitigation device 102 may sort the results stored in the table. In one embodiment, the mitigation device 102 may sort the results by number of packet header fields in each combination and by number of occurrences for each combination. It should be noted that the table entries having the greatest number of packet header fields and matches (counter values) represent data patterns that occur most frequently in the analyzed portion of data (such as the snapshot shown in Table 1 above). These patterns in the collected data are most likely to be representative of suspicious traffic. Accordingly, at step 214, the mitigation device 102 may identify table entries having the highest counter values. Still continuing with the example above, if the mitigation device 102 sorts all generated combinations for the ten packets shown in Table 1 and the sorting is performed on the number of fields per combination and the counter value associated with each combination, the two following entries would be at the top of the sorted list:

{1.2.3.4, 1234, 10.2.55.87, 80    } - 3 matches
{                10.2.55.87, 80, 55} - 5 matches Since, at least in some implementations, the results table may include all possible combinations generated based on the information contained in thousands of packets, in this step the mitigation device 102 may identify entries with the highest counter values that exceed a predetermined threshold to avoid false positives. In one embodiment this predetermined threshold may comprise, for example, 10 percent of all analyzed packets.

Next, at step 216, the mitigation device 102 may analyze the content of the identified entries. The first identified entry having 3 matches would be considered legitimate by the mitigation device 102 as this entry contains some constant information, such as a constant source IP address (1.2.3.4) and source port number (1234) and yet packet length is not constant. The second identified entry having 5 matches would be considered to be malicious by the mitigation device 102 as this entry's source IP address and source port number information is not constant, while the packet length is constant. In alternative embodiments, the mitigation device 102 may include logic configured to analyze packet payload information to detect potential malicious application specific attacks.

According to an embodiment of the present invention, at step 218, the mitigation device 102 may present results of the performed attack mitigation analysis to a user by utilizing a user interface.

Figure 4:
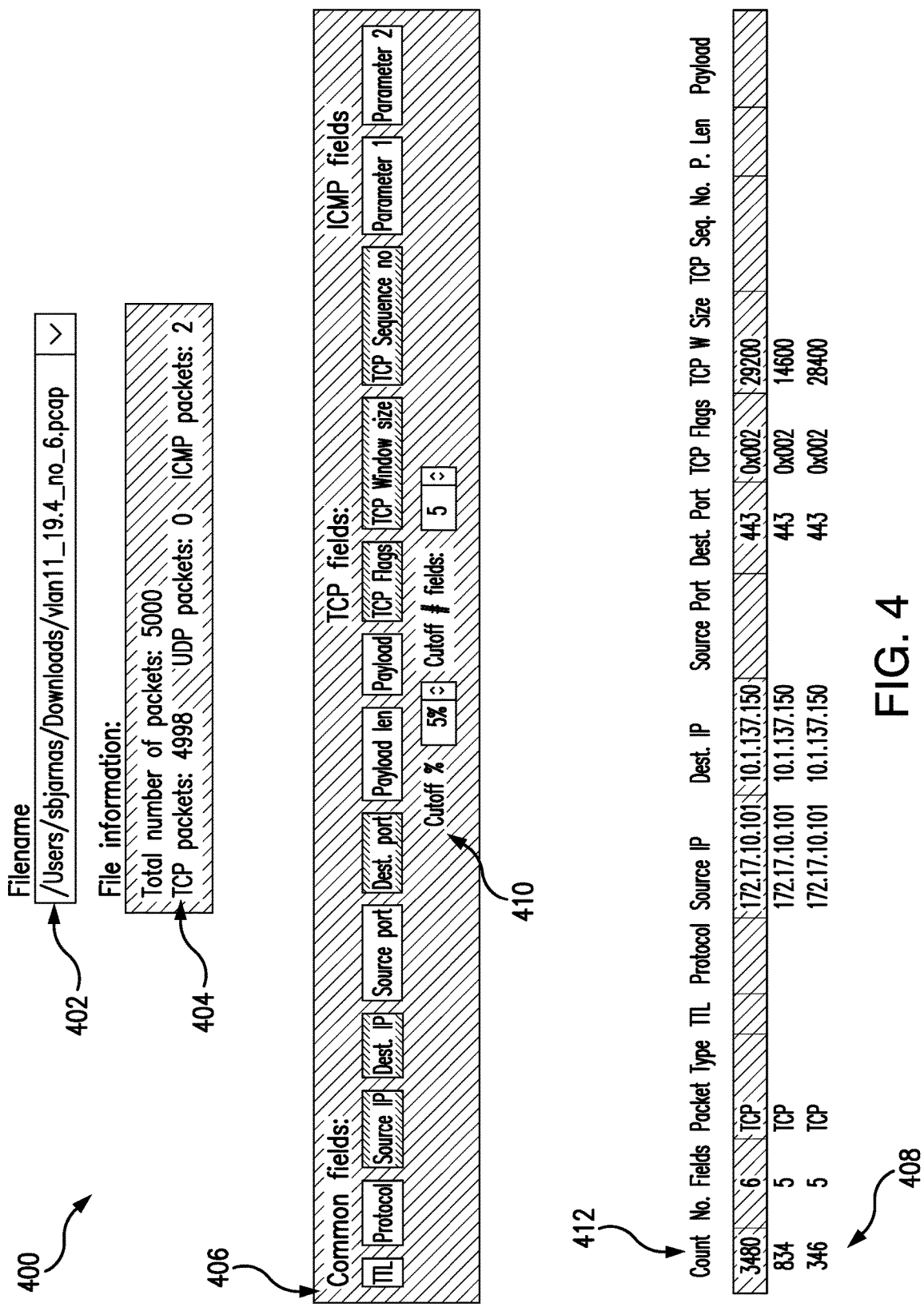
FIG. 4 is an exemplary screenshot of a user interface displaying malicious attack detection results, according to one or more embodiments discussed herein.

FIG. 4 is an exemplary screenshot of a graphical user interface (GUI) displaying attack detection results, according to one or more embodiments discussed herein. The GUI provides a window 400 for navigating the various PCAP files or some other types of log files stored or loaded into the memory of the mitigation device 102. The GUI further displays a file menu 402 for accessing the various files. In this exemplary embodiment, the GUI may also display file information 404, fields information 406 and analysis results information 408. The file information section 404 may provide information related to a number and one or more types of captured packets (e.g., TCP packets, UDP packets, ICMP packets) contained within the analyzed file. The fields information section 406 may provide information related to all fields within each captured packet that have been analyzed by the mitigation device 102. According to an embodiment of the present invention, users may also have an ability to adjust threshold values 410 utilized in detecting malicious traffic by the mitigation device 102. The analysis results section 408 may be used to display information associated with the entries identified as potentially suspicious traffic by the mitigation device 102 in step 214. It should be noted that the counter values 412 associated with each entry may be presented in a sorted order from highest to lowest value.

Referring back to FIG. 2, optionally, at step 220, the mitigation device 102 may automatically implement one or more attack mitigation measures based on the results of the performed analysis. For instance, continuing with the example above, the mitigation device 102 may automatically generate a packet filter which would drop all packets having the destination IP address=10.2.55.87, destination port number=80 and packet length=55. Further, the mitigation device 102 can initiate specific mitigation policies localized to a particular application.

Figure 3:
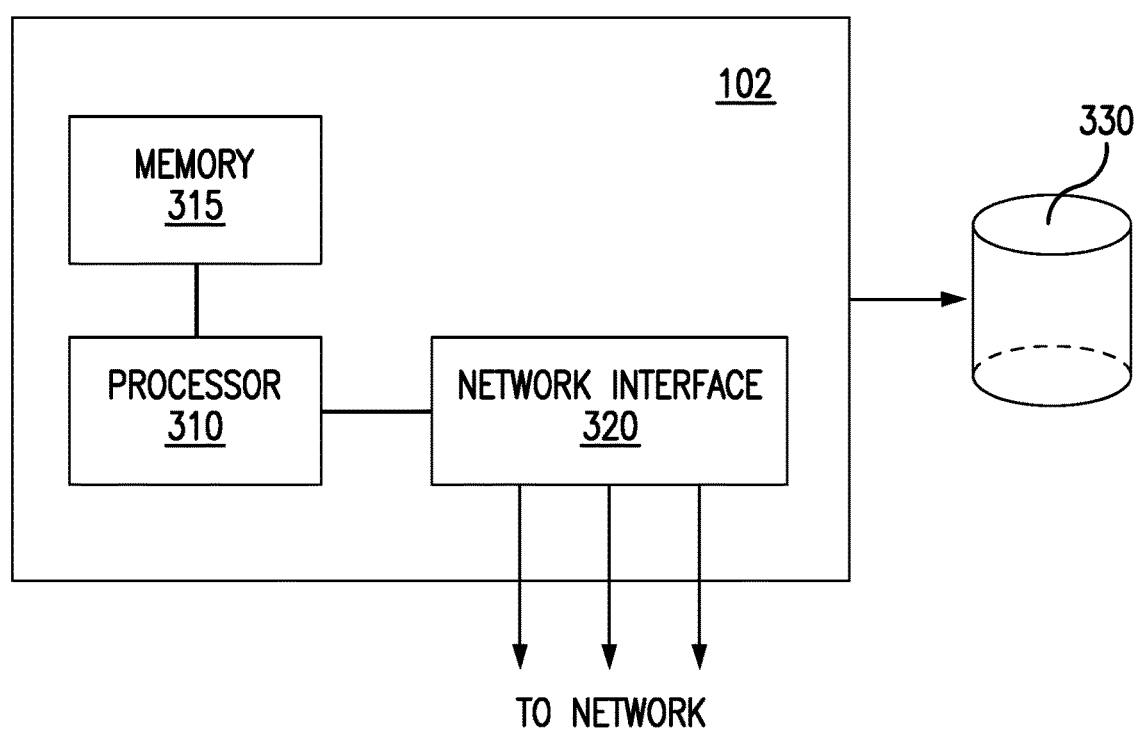
FIG. 3 is a block diagram of the attack mitigation device of FIG. 1, in accordance with an embodiment of the present invention.

With reference now to FIG. 3, illustrated is an exemplary and non-limiting block diagram of the attack mitigation device 102 constructed according to an illustrated embodiment. The attack mitigation device 102 is communicatively coupled to the protected network 100 and to the database 330 (i.e., storage medium 116 storing results tables 118 and/or storing network traffic flow information), as shown in FIG. 3, and is at least configured to execute the method for mitigating network attacks as described in greater detail above. The attack mitigation device 102 preferably includes a processor 310 coupled to a memory 315 and a network-interface module 320. The network-interface module 320 allows the communication with the protected network 100. The processor 310 uses instructions stored in the memory 315 to execute attack detection tasks as well as to control and enable the operation of the network-interface module 320.

In summary, various embodiments of the present invention disclose a novel approach to detecting data patterns by employing a combination of different analysis procedures/algorithms (e.g., content analysis and statistical analysis). In one embodiment, this approach takes a different perspective on how to provide an effective response to a DoS/DDoS type of attack than do conventional approaches. The disclosed approach provides a number of advantages. In one aspect, software programming code embodying the present invention provides an ability to perform analysis either on live or stored network data. In another aspect, the attack mitigation device 102 may use the results of the malware detection analysis to block packets matching detected patterns, either in a manual or automated fashion. As yet another advantage, although the method depicted in FIG. 2 is described with reference to the IP packet header analysis, it is not limited thereto. The disclosed processing functionality performed by the attack mitigation device 102 may be applicable to packet payload analysis, as well as any other structured data analysis.

Most preferably, the various embodiments disclosed herein can be implemented as any combination of hardware, firmware, and software. Moreover, the software is preferably implemented as an application program tangibly embodied on a program storage unit or computer readable medium. The application program may be uploaded to, and executed by, a machine comprising any suitable architecture. Preferably, the machine is implemented on a computer platform having hardware such as one or more central processing units ("CPUs"), a memory, and input/output interfaces. The computer platform may also include an operating system and microinstruction code. The various processes and functions described herein may be either part of the microinstruction code or part of the application program, or any combination thereof, which may be executed by a CPU, whether or not such computer or processor is explicitly shown. In addition, various other peripheral units may be connected to the computer platform such as an additional data storage unit and a printing unit. Furthermore, a non-transitory computer readable medium is any computer readable medium except for a transitory propagating signal.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method for detecting patterns using statistical analysis, the method comprising:
   receiving a subset of structured data having a plurality of fields;
   generating a plurality of value combinations for the plurality of fields using a statistical combination function;
   storing each combination of the generated plurality of value combinations as a separate entry in a single results table, wherein the entry in the results table includes a counter associated with the stored combination and wherein a value of the counter is incremented for every occurrence of the stored combination in the generated plurality of value combinations;
   sorting the single results table based on both the (a) counters' values and (b) a number of fields in each combination;

identifying one or more entries in the sorted single results table having highest counter values; and at least one of:
  (a) analyzing content of the identified one or more entries to detect a pattern; and
    identifying a network attack based on the detected pattern; and
  (b) automatically generating a network traffic filter based on results of the sorting.

2. The method of claim 1, wherein the structured data comprises a snapshot of live network traffic data stream.

3. The method of claim 2, wherein the subset of structured data comprises a plurality of packets and wherein the plurality of fields comprises a plurality of header fields included in the plurality of packets.

4. The method of claim 3, wherein the snapshot of live network traffic data includes from approximately 1000 packets to approximately 5000 packets.

5. The method of claim 2, wherein the subset of structured data comprises a plurality of packets and wherein the plurality of fields comprises content of a plurality of fields included in a payload of the plurality of packets.

6. The method of claim 1, wherein the structured data comprises a snapshot of stored network traffic data.

7. The method of claim 1, wherein the detected pattern is reported as the network attack data, responsive to a determination that the counter values associated with the one or more identified entries exceed a threshold value.

8. A monitoring system comprising:
a monitored network comprising a plurality of devices;
a storage repository for storing network traffic flow information; and
one or more network monitoring devices communicatively coupled to the monitored network and to the storage repository, wherein the one or more network monitoring devices are configured and operable to:
receive from the storage repository a subset of structured data having a plurality of fields;
generate a plurality of value combinations for the plurality of fields using a statistical combination function;
store each combination of the generated plurality of value combinations as a separate entry in a single results table, wherein the entry in the results table includes a counter associated with the stored combination and wherein a value of the counter is incremented for every occurrence of the stored combination in the generated plurality of value combinations;
sort the single results table based on both the (a) counters' values and (b) a number of fields in each combination;
identify one or more entries in the sorted single results table having highest counter values; and at least one of:
  (a) analyze content of the identified one or more entries to detect a pattern; and
    Identify a network attack based on the detected pattern; and
  (b) automatically generate a network traffic filter based on results of the sorting.

9. The monitoring system as recited in claim 8, wherein the one or more network monitoring devices configured and operable to receive the subset of the structured data are further configured and operable to receive the subset from a live network traffic data stream.

10. The monitoring system as recited in claim 9, wherein the subset of structured data comprises a plurality of packets and wherein the plurality of fields comprises a plurality of header fields included in the plurality of packets.

11. The monitoring system as recited in claim 10, wherein the subset of data includes from approximately 1000 packets to approximately 5000 packets.

12. The monitoring system as recited in claim 8, wherein the structured data comprises a snapshot of network traffic data stored in the storage repository.

13. A network monitoring device configured and operable to:
receive a subset of structured data having a plurality of fields;
generate a plurality of value combinations for the plurality of fields using a statistical combination function;
store each combination of the generated plurality of value combinations as a separate entry in a single results table, wherein the entry in the results table includes a counter associated with the stored combination and wherein a value of the counter is incremented for every occurrence of the stored combination in the generated plurality of value combinations;
sort the single results table based on both the (a) counters' values and (b) a number of fields in each combination;
identify one or more entries in the results table having highest counter values; and at least one of:
  (a) analyze content of the identified one or more entries to detect a pattern; and
    identify a network attack based on the detected pattern; and
  (b) automatically generate a network traffic filter based on results of the sorting.

14. The network monitoring device as recited in claim 13, wherein the structured data comprises a snapshot of live network traffic data stream.

15. The monitoring system as recited in claim 13, wherein the structured data comprises a snapshot of network traffic data stored in a storage repository.

* * * * *